US006965462B1

(12) United States Patent
Henderson et al.

(10) Patent No.: US 6,965,462 B1
(45) Date of Patent: Nov. 15, 2005

(54) INCREASED TEMPORAL FLEXIBILITY WHEN PERFORMING/APPLYING/REVERTING CALIBRATION FOR A PRINTER OUTPUT DEVICE

(75) Inventors: Todd R. Henderson, Conesus, NY (US); Ammar T. Degani, Rochester, NY (US); Michael A. Wiegand, Webster, NY (US); Richard J. Eddy, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/563,029

(22) Filed: May 1, 2000

(51) Int. Cl.$^7$ ............................................. G06K 15/00
(52) U.S. Cl. ..................... 358/504; 358/3.21; 358/3.24
(58) Field of Search ........................... 358/1.1, 1.9, 2.1, 358/2.14, 3.01, 3.03, 3.04, 3.07, 3.08, 3.09, 358/3.1, 3.14, 3.2, 3.21, 3.22, 3.23, 3.24, 358/1.13, 1.14, 1.6, 3.02, 3.05, 504, 516, 358/518, 526, 406

(56) References Cited

U.S. PATENT DOCUMENTS

| 5,293,539 A | 3/1994 | Spence |
| 5,347,369 A | 9/1994 | Harrington |
| 5,471,313 A | 11/1995 | Thieret et al. |
| 5,585,927 A | 12/1996 | Fukui et al. |
| 5,612,902 A | 3/1997 | Stokes |
| 5,649,073 A | 7/1997 | Knox et al. |
| 5,696,889 A | 12/1997 | Morikawa |
| 5,777,656 A | 7/1998 | Henderson |
| 5,838,465 A | 11/1998 | Satou et al. |
| 6,035,152 A | 3/2000 | Craig et al. |
| 6,048,117 A | 4/2000 | Banton |

FOREIGN PATENT DOCUMENTS

| EP | 0 825 553 A2 | 2/1998 |
| EP | 0 825 553 A3 | 2/1999 |

*Primary Examiner*—Arthur G. Evans
(74) *Attorney, Agent, or Firm*—Fay, Sharpe, Fagan, Minnich & McKee, LLP

(57) ABSTRACT

A system for compensating for a calibration drift in an image output device includes a user input means for specifying an output medium. An image output device controller converts original image data to final image data used by the image output device. The image output device produces a calibration image, as a function of an output medium, for a plurality of halftone screens capable of being produced by the image output device. A processor communicates with the controller. The processor calculates a plurality of candidate tone reproduction curve sets for the specified output medium. Each of the sets corresponds to one of the plurality of halftone screens. The candidate tone reproduction curve sets are accepted for compensating for a calibration drift in the image output device.

20 Claims, 3 Drawing Sheets

INCREASED TEMPORAL FLEXIBILITY WHEN PERFORMING/APPLYING/REVERTING CALIBRATION FOR A PRINTER OUTPUT DEVICE

BACKGROUND OF THE INVENTION

The present invention relates to calibrating an electronic printer output device. It finds particular application in conjunction with calibrating an electronic printer output device using a tone reproduction curve ("TRC") and will be described with particular reference thereto. It will be appreciated, however, that the invention is also amenable to other like applications.

An electronic printer output device ("printing device"), also referred to as an image output terminal ("IOT"), is generally capable of producing color and standard black-and-white tones to produce images. The printing device accepts color level specifications (typically for each of four (4) colors including cyan, magenta, yellow, and black ("CMYK")) as input and produces corresponding color areas on a printed page. This production of the corresponding color areas is often performed by a screening operation (also referred to as a halftoning operation) wherein a fine pattern of color dots is printed. The dots appear as varying color tones in accordance with the number of color dots used when viewed from a distance. The allowed color level specifications for each of the CMYK color spaces generally vary over some finite range such as 0 to 1 or 0 to 255. The colors at the extremes (i.e., 0 and 1 or 0 and 255) are white and saturated CMYK colors, and numbers between the extremes yield intermediate color tones. However, while the color level specifications may vary linearly, a linear change in color levels typically does not result. Instead, there may be a particular threshold before lighter toned colors become visible. Similarly, darker toned colors may prematurely appear saturated.

A printing device is designed to operate under certain conditions. More specifically, a printing device is calibrated to operate at an ideal set-point, for producing relatively consistent output when used within an environment having specific desired operating parameters such as, for example, a specific humidity, temperature, and dust count, etc. If any of the operating parameters deviates from the desired operating parameter, the printing device may drift away from the ideal set-point. To some extent the drift can be corrected with controlled feedback mechanisms within the printing device itself, but typically requires further corrective action to maintain color consistency in the printed output. This invention relates to this corrective action.

One way to compensate for the drift within the printing device includes modifying data within a printing device output device controller ("controller"). The controller converts image data (e.g., PostScript® data or PDF data) into raster data, which is transmitted to the printing device where it is printed. More specifically, a calibration (or correction) TRC modifies the raster data before it is sent to the printing device. The resulting image produced by the printing device using the corrected raster data is printed correctly (i.e., as if the printing device had not drifted from the ideal set-point and the data was not corrected by the TRC). Both linear and nonlinear drifts within a printing device may be compensated by using calibration TRCs.

In order to accurately produce a desired color level, the correspondence between the color level specification of the printing device and the actual color level produced by the printing device must be known. The TRC provides an illustration of the corresponding relationship.

In order to determine the TRC, a sample set of color level specifications are printed and the color levels actually produced by the printing device are measured by a device such as a calorimeter or spectrophotometer. The measured points are then used as raw data to calculate a set of curves. The set of curves produced are referred to as the calibration TRCs, or simply as TRCs. Various methods exist for creating TRCs. One such method is set forth in U.S. Pat. No. 5,696,889, which is hereby incorporated by reference.

Although TRCs can be created and applied to correct for drifts in a printing device output, there is currently no method or system that permits a user to specify a boundary (e.g., page, set, or job) after which a calibration process begins for a specified output medium. Furthermore, there is no method or system that permits the user to then specify a boundary (e.g., page, set, or job) after which TRCs that were calculated during the calibration process will be applied to future outputs of the printing device.

The present invention provides a new and improved apparatus and method which overcomes the above-referenced problems and others.

SUMMARY OF THE INVENTION

A method for calibrating a printer output device identifies an output medium. A calibration image is produced on the output medium. The calibration image represents a plurality of available halftone screens. Colors on the calibration image are measured. A plurality of candidate tone reproduction curve sets are calculated for the identified output medium. Each of the sets corresponds to one of the available halftone screens. The sets of the tone reproduction curves are accepted for calibrating the printer output device to compensate for drifts from an optimum set-point.

In accordance with one aspect of the present invention, a calibration boundary is identified. An output process of the image output terminal is suspended after the identified calibration boundary.

In accordance with another aspect of the present invention, the calibration image on the medium is input into an image processor.

In accordance with a more limited aspect of the present invention, versions of existing sets of tone reproduction curves, which were previously stored in the image processor, are browsed.

In accordance with an even more limited aspect of the present invention, one of the existing sets of tone reproduction curves is compared with one of the candidate sets of the tone reproduction curves.

In accordance with another aspect of the present invention, an acceptance boundary, after which the accepted tone reproduction curve will be used for calibrating the printer output device, is specified.

In accordance with another aspect of the present invention, an alternative output medium, which is to be associated with the accepted set of tone reproduction curves, is selected.

In accordance with another aspect of the present invention, a reversion is made to a previous version of existing sets of tone reproduction curves for any identified output medium.

One advantage of the present invention is that it provides a method and system for applying various sets of TRCs that are dependent on output mediums and/or halftoning screens.

Another advantage of the present invention is that it provides a method and system for calculating various sets of TRCs after a user specified page, set, and/or job boundary.

Another advantage of the present invention is that it provides a method and system for applying the various sets of TRCs after a user specified page, set, and/or job boundary.

Still further advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
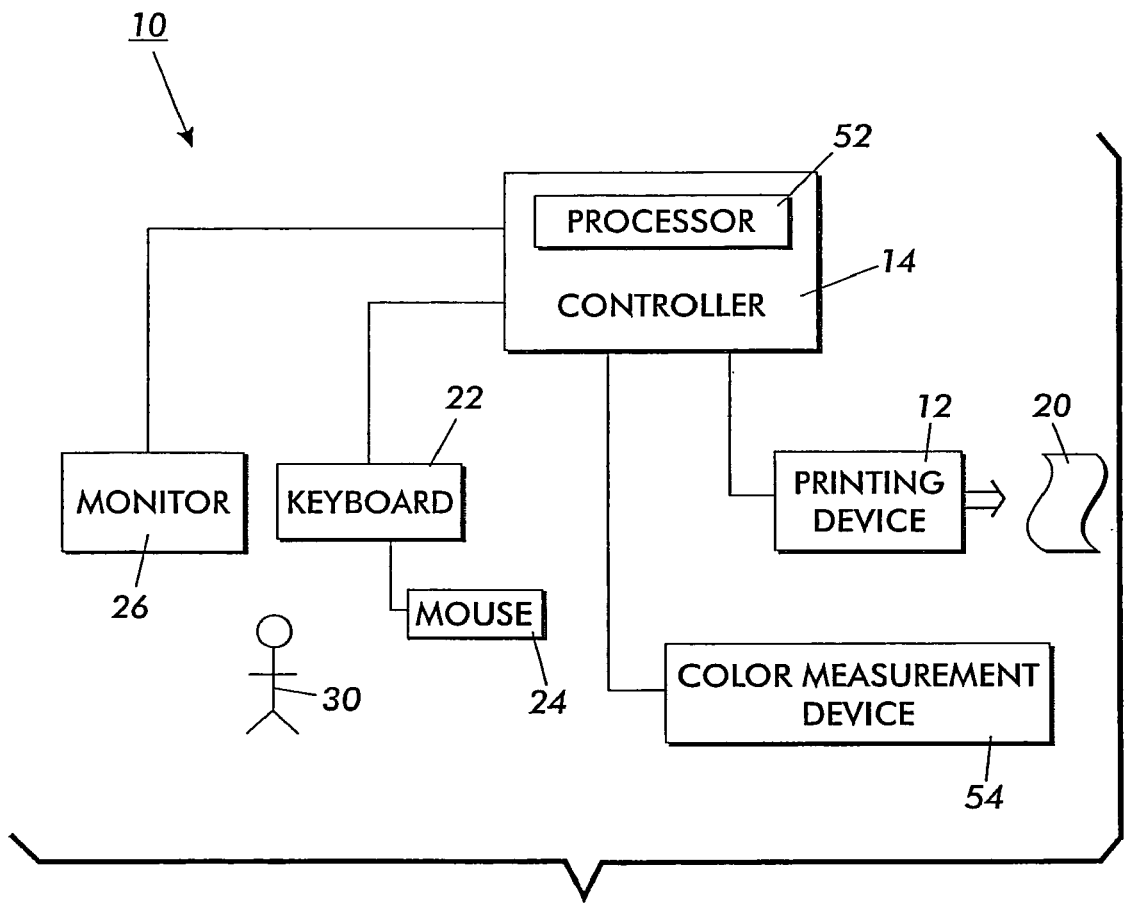
FIG. 1 illustrates a system according to the present invention.

With reference to FIG. 1, a system 10 for compensating for a calibration drift includes an electronic printer output device ("printing device") 12, also referred to as an image output terminal ("IOT"), and a printer output device controller ("controller") 14 (image data generator). In the preferred embodiment, the printing device is a color printer. However, it is also contemplated that the printing device be a black-and-white printer or a color and black-and-white facsimile machine.

The controller 14 converts original image data (e.g., PostScript® or PDF format), which is received by the controller 14, to final image data (e.g., raster data). The final image data is transmitted from the controller 14 to the printing device 12, which renders the image data on an output medium 20. In the preferred embodiment, the output medium is some type of paper (e.g., glossy or semi-glossy). However, other types of output media (e.g., plastic transparency) are also contemplated.

By operating various input devices (e.g., a keyboard 22 and/or a mouse 24) and a viewing monitor 26, which communicate with the controller 14, a user 30 is capable of correcting a calibration drift (or a drift from an optimum set-point), which is associated with the printing device 12, by processing the final image data that is transmitted to the printing device 12. In other words, if the calibrated settings of the printing device 12 drift over time, the final image data that is transmitted to the printing device 12 may be modified to bring the output produced by the printing device 12 back to the desired quality.

Figure 2:
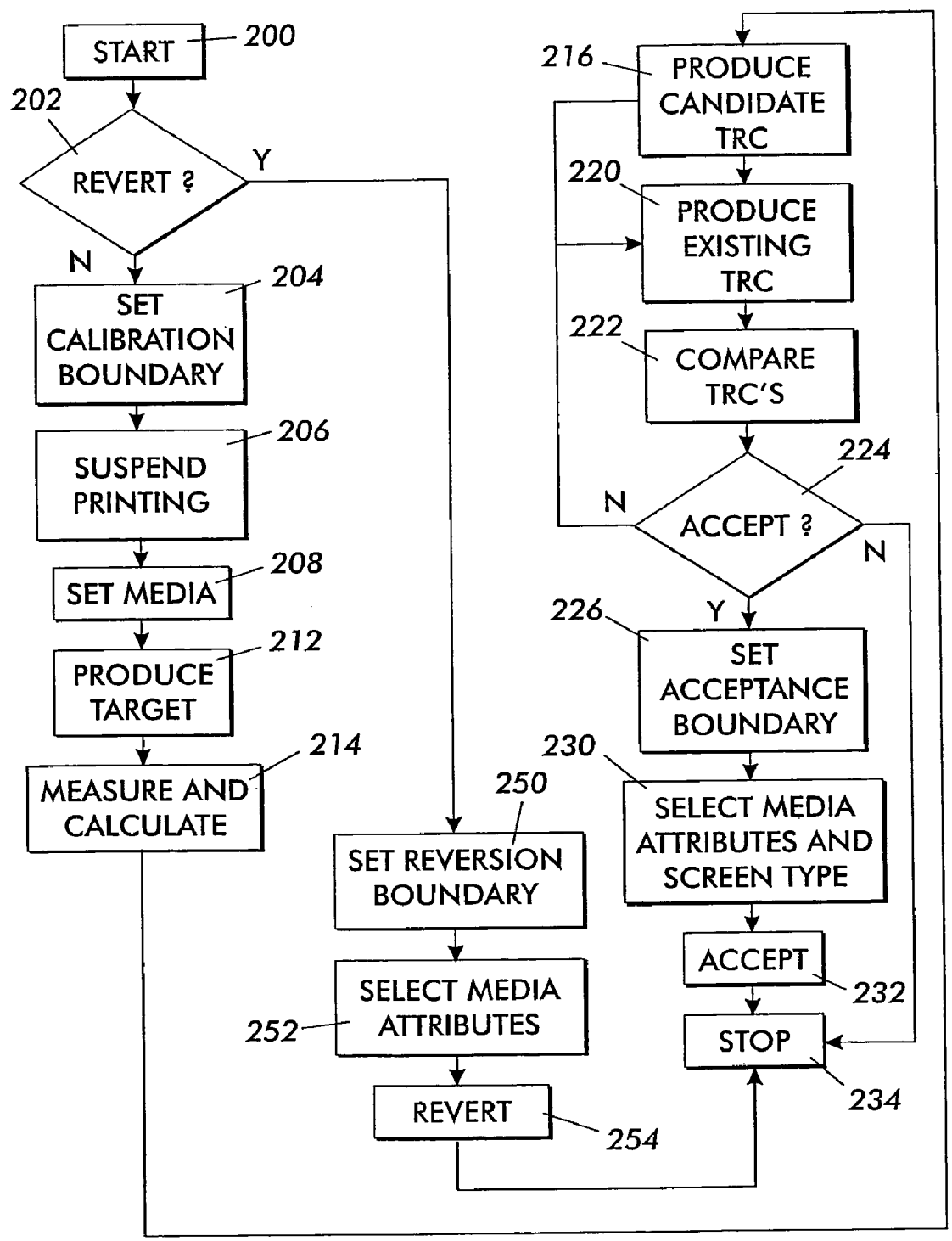
FIG. 2 illustrates a flowchart according to the present invention.
Figure 3:
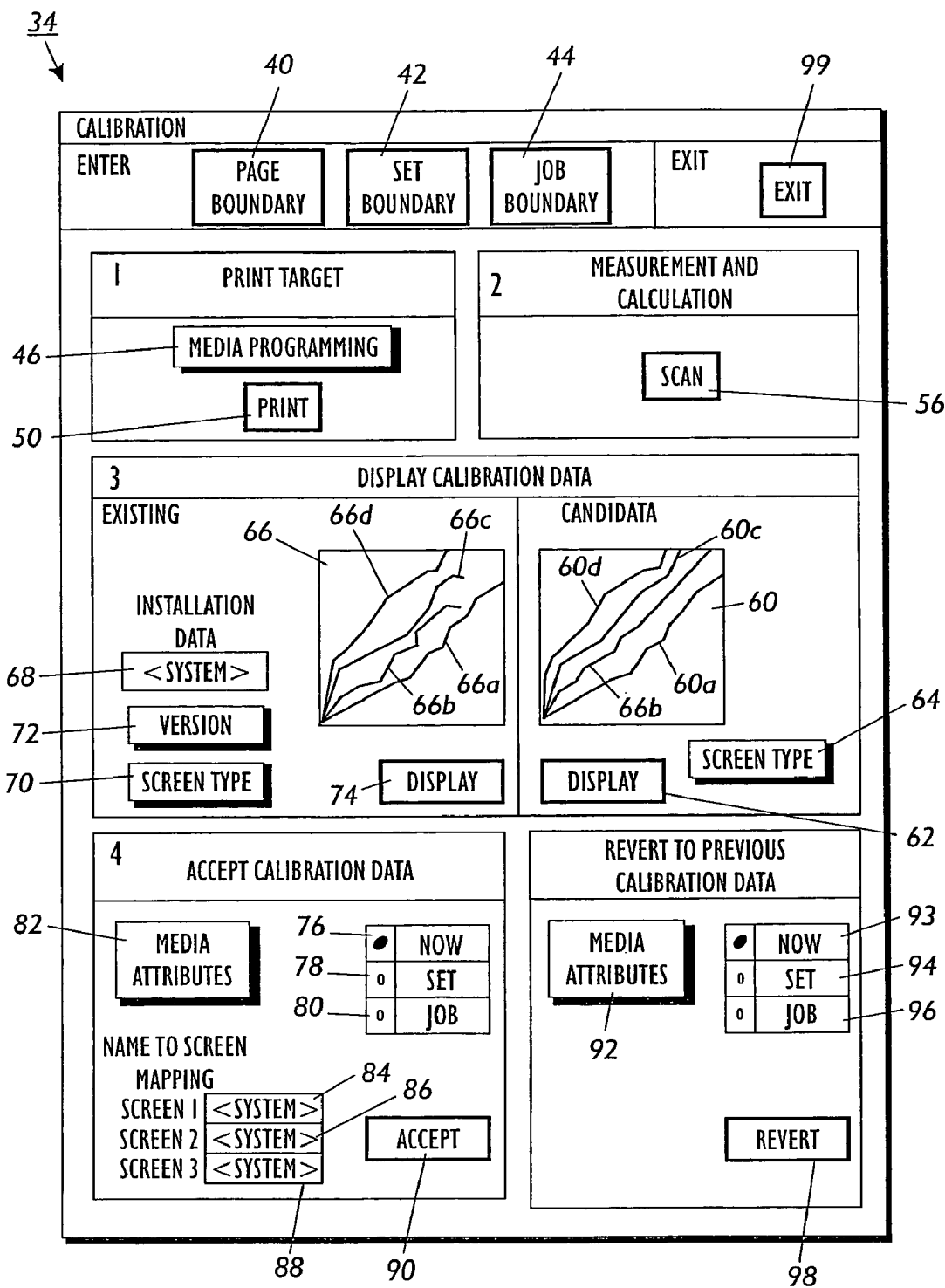
FIG. 3 illustrates a computer display screen according to the present invention.

FIG. 2 shows a flowchart 32 of a method for calibrating the printing device 12 to compensate for calibration drifts. FIG. 3 illustrates a preferred display screen 34 that may be viewed by the user during the calibration process outlined in FIG. 2.

With reference to FIGS. 1–3, a method for compensating for a calibration drift within the printing device 12 starts at a step 200. A determination is made in a step 202 if the user 30 merely desires to revert back to a previously stored set of TRCs. If the user 30 does wish to revert to a previous set of TRCs, control passes to a step 250. The reversion process will be described in more detail below. Otherwise, if the user 30 does not wish to revert to a previous set of TRCs, control passes to a step 204.

A calibration boundary is specified by the user 30 in the step 204. More specifically, using the keyboard 22 or mouse 24, the user 30 selects one of three (3) "buttons" 40, 42, 44 displayed on the monitor 26. In this way, the user 30 delays the calibration process from beginning until after the specified calibration boundary is reached.

An output "job" includes one or more "sets," while each "set" includes one or more groups of "pages." Therefore, a user may, for example, desire to print five (5) sets of groups, each of which includes three (3) pages. Clicking on the Page Boundary button 40 delays the beginning of the calibration process until after the current page is completely printed; clicking on the Set Boundary button 42 delays the beginning of the calibration process until after the current set (e.g., group of three (3) pages) is completely printed; clicking on the Job Boundary button 44 delays the beginning of the calibration process until after the current job (e.g., all five (5) sets) is completely printed.

There are several reasons why it is desirable to specify a calibration boundary for delaying the start of the calibration process. For example, although an output quality has begun to deteriorate, it may be desirable to keep all pages within each set to a consistent level of quality, which would be achieved by clicking the Set Boundary button 42. Alternatively, if it is desirable to maintain a consistent level of quality within a job, the user would click the Job Boundary button 44. Furthermore, because the process described below requires a calibration image (target image) to be produced, the Page Boundary button 40 alerts the system to finish printing the current page so that a complete calibration page (target page), which includes the calibration image, may be produced.

Once the calibration boundary is reached, the controller 14 suspends an output process of the printing device 12 in a step 206. Then, in a step 208, the user 30 specifies the type of medium (e.g., glossy paper, matted paper, clear transparency, etc.) on which the calibration image (target image) is to be produced by selecting a Media Programming button 46. The target image is produced, in a step 212, on the specified medium using the printing device 12 by selecting a Print button 50. Preferably, the target image represents all the halftone screens supported by the printing device 12. The target image is input into an image processor 52 in a step 214, preferably using a color measurement device 54, such as a calorimeter or spectrophotometer, by selecting a Scan button 56. More specifically, colors on the target image are measured in the step 214. Then, data representing the measured colors is transmitted from the scanning device 54 to the processor 52, which is preferably included within the controller 14. Then, the processor 52 calculates candidate sets of tone reproduction curves. The number of sets so produced is preferably the same as the number of halftone screens supported by the printing device 12. It is to be understood that the candidate sets of TRCs are stored in the processor 52. In this manner, the candidate sets of TRCs may be recalled at a future time as existing TRCs, the benefits of which will become apparent from the discussion outlined below.

Each of the candidate sets of TRCs represents one of the halftone screens supported by the printing device 12. Furthermore, each of the sets preferably includes four (4) lines 60a, 60b, 60c, 60d; each of the lines 60a, 60b, 60c, 60d corresponds to one of the colors in the CMYK color space.

In a step 216, the user 30 displays one of the sets of TRCs. More specifically, the user 30 selects one of the screen types using a Screen Type button 64 before selecting a Display button 62. Once the Display button 62 is selected, an image of the candidate set of TRCs 60 for the selected screen type is displayed.

Then, in steps 220, 222, 224, the user 30 browses through previously stored versions of TRCs (i.e., existing TRCs) for the specified medium type, which are stored in the controller 14 and classified according to halftone screens. As discussed above, the candidate sets of TRCs that were calculated by the processor 52 will be available as existing TRCs in future calibration processes.

In the step 220, the user 30 displays one of the existing TRC sets 66. More specifically, the user 30 chooses a halftone screen type by selecting a Screen Type button 70. Then, the user 30 chooses one of the existing versions for the selected screen type by selecting the Version button 72. The existing TRC set 66 for the selected halftone screen type and version is displayed when the user 30 selects the Display button 74. System information (e.g., the date the currently displayed existing set of TRCs was installed) is displayed in a window 68.

In the step 222, the user 30 compares the currently displayed candidate TRC set 60 with the currently displayed existing TRC set 66. For example, the user 30 may be familiar with the output that will be produced using the currently displayed existing TRC set 66. Furthermore, a sophisticated user may be able to determine whether the candidate TRC set 60 will produce acceptable output on the printing device 12 by comparing the lines 60a, 60b, 60c 60d with the lines 66a, 66b, 66c 66d in the existing curve 66.

In a step 223, the user 30 chooses whether to compare the lines 60a, 60b, 60c 60d with the lines 66a, 66b 66c 66d for another halftone screen type. If the comparison is desired, control returns to the step 216 where the lines are selected by halftone screen type (using the Screen Type button 64) and displayed by selecting the Display button 62, or to the step 220 where the lines are selected by halftone screen type (using the Screen Type button 70) and displayed by selecting the Display button 74. Otherwise, if the user 30 no longer wishes to compare the lines 60a, 60b, 60c 60d with the lines 66a, 66b 66c 66d for another halftone screen type, control passes to the step 224.

In the step 224, the user 30 determines whether to accept the currently displayed candidate TRC set 60. If the user 30 does not decide to accept the candidate TRC set 60, control passes to a step 234 for stopping the calibration process (if the user 30 determines not to accept the candidate TRC sets). Alternatively, if the user 30 determines to accept the currently displayed candidate TRC set 60, control passes to a step 226.

In the step 226, the user 30 sets an acceptance boundary after which the new (accepted) TRC set 60 (i.e., the currently displayed candidate TRC set) will be used by the processor 52 for generating future final image data. More specifically, the user 30 selects one of the Now, Set, or Job buttons 76, 78, 80 to indicate that the new TRC set 60 will be used beginning with the next output page, set, or job, respectively. Then, in a step 230, the user 30 also sets the media type (by selecting a Media Attributes button 82) with which the new set of tone reproduction curves will be used. A default medium type, which is the medium type selected in the step 208, is initially displayed.

Once the type of medium that will be used with the currently displayed candidate TRC set 60 is selected, system information regarding the halftone screen types associated with the currently displayed candidate TRC set 60 is shown in windows 84, 86, 88. More specifically, the processor 52 preferably assigns identifying names to each of the halftone screens supported by the printing device 12. The identifying names are then displayed in the windows 84, 86, 88.

Then, the new tone reproduction curve set is accepted by selecting the Accept button 90 in a step 232.

If the user 30 wishes to produce a new tone reproduction curve set for another type of medium, the above described steps are carried out again by selecting said type of medium in 46 in the step 208. In this manner, the new TRC set accurately reflects the dependence on the medium type. However, rather than carrying out the above process again for another medium type, a less sophisticated user may wish to associate the current candidate TRC set 60 with another type of medium. If the user 30 wishes to do this in a step 233, control returns again to step 230 where an alternative medium is set by 82. This process continues until the user 30 wishes to associate no more medium types with the current candidate TRC set 60 in which case control passes to the step 234.

The calibration stops in the step 234. Then, the user 30 exits the calibration screen 34 by selecting an Exit button 99.

After the new TRC set has been accepted and new output has been produced by the printing device 12 as a function of the new TRC set, the user 30 may determine the quality of the new output is inferior. In this case, the user 30 may want to revert back to the most recently stored set of tone reproduction curves. Therefore, the user 30 starts the calibration process again in the step 200. Then, in the step 202, the user 30 indicates that reversion is desirable. Therefore, control passes to a step 250.

In the step 250, the user 30 sets a reversion boundary by selecting one of a Now, Set, or Job button 93, 94, 96, respectively. The selected reversion boundary indicates when the processor 52 will revert to the most recent set of TRCs; until the selected reversion boundary is reached, the currently selected set of TRCs 60 will continue to be used by the processor 52 for producing the final image data.

Then, in a step 252, the user 30 identifies the associated media attributes (e.g., the type of medium) of the TRC set to be deleted. More specifically, because different types of media may have been associated with the candidate TRC set (e.g., in the step 230), the user 30 identifies the medium type of the TRC set to be deleted.

Then, in a step 254, the user 30 reverts to the most recent existing TRC set stored in the processor 52 by selecting a Revert Button 98. Control then passes to the step 234.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A method for calibrating a printer output device comprising:
   identifying a calibration boundary;
   suspending an output process of the image output terminal after the identified calibration boundary;
   identifying an output medium;
   producing a calibration image on the output medium, the calibration image representing a plurality of available halftone screens;
   measuring colors on the calibration image;

calculating a plurality of candidate tone reproduction curve sets for the identified output medium, each of the sets corresponding to one of the available halftone screens; and accepting the sets of the tone reproduction curves for calibrating the printer output device to compensate for drifts from an optimum set-point.

2. A method for calibrating a printer output device, further comprising:

identifying an output medium;

producing a calibration image on the output medium, the calibration image representing a plurality of available halftone screens;

measuring colors on the calibration image;

calculating a plurality of candidate tone reproduction curve sets for the identified output medium, each of the sets corresponding to one of the available halftone screens;

inputting the calibration image on the medium into an image processor;

browsing versions of existing sets of tone reproduction curves which were previously stored in the image processor;

comparing one of the existing sets of tone reproduction curves with one of the candidate sets of the tone reproduction curves and accepting the sets of the tone reproduction curves for calibrating the printer output device to compensate for drifts from an optimum set-point.

3. A method for calibrating a printer output device, comprising:

identifying an output medium;

producing a calibration image on the output medium, the calibration image representing a plurality of available halftone screens;

measuring colors on the calibration image;

calculating a plurality of candidate tone reproduction curve sets for the identified output medium, each of the sets corresponding to one of the available halftone screens;

accepting the sets of the tone reproduction curves for calibrating the printer output device to compensate for drifts from an optimum set-point; and specifying an acceptance boundary after which the accepted tone reproduction curve will be used for calibrating the printer output device.

4. A method for calibrating a printer output device, comprising:

identifying an output medium;

producing a calibration image on the output medium, the calibration image representing a plurality of available halftone screens;

measuring colors on the calibration image;

calculating a plurality of candidate tone reproduction curve sets for the identified output medium, each of the sets corresponding to one of the available halftone screens;

accepting the sets of the tone reproduction curves for calibrating the printer output device to compensate for drifts from an optimum set-point, and selecting an alternative output medium to be associated with the accepted set of tone reproduction curves.

5. A method for calibrating a printer output device, comprising:

identifying an output medium;

producing a calibration image on the output medium, the calibration image representing a plurality of available halftone screens;

measuring colors on the calibration image;

calculating a plurality of candidate tone reproduction curve sets for the identified output medium, each of the sets corresponding to one of the available halftone screens;

accepting the sets of the tone reproduction curves for calibrating the printer output device to compensate for drifts from an optimum set-point; and reverting to a previous version of existing sets of tone reproduction curves for any identified output medium.

6. A system for compensating for a calibration drift in an image output device, comprising:

a user input for specifying an output medium;

an image output device controller for converting original image data to final image data used by the image output device, the image output device producing a calibration image, as a function of an output medium, for a plurality of halftone screens capable of being produced by the image output device;

an image input device for converting the calibration image into calibration data, which is transmitted to the processor for calculating the plurality of candidate tone reproduction curve sets;

a processor communicating with the controller, the processor calculating a plurality of candidate tone reproduction curve sets for the specified output medium, each of the sets corresponding to one of the plurality of halftone screens;

the processor including a first processor section which is configured to accept the candidate tone reproduction curve sets for compensating for a calibration drift in the image output device; and the processor including a second processor section configured to delete the accepted set of tone reproduction curves and revert to an existing set of tone reproduction curves.

7. The system for compensating for a calibration drift in an image output device as set forth in claim 6, further including:

a display on which is displayed different candidate tone reproduction curve sets and visually comparing the displayed candidate set of tone reproduction curves with an existing set of tone reproduction curves.

8. The system for compensating for a calibration drift in an image output device as set forth in claim 6, wherein an output process of the image output device is suspended after a calibration boundary, which is set by a user, is reached, the calibration image being produced after the output process is suspended.

9. A system for compensating for a calibration drift in an image output device, comprising:

a user input means for specifying an output medium;

an image output device controller for converting original image data to final image data used by the image output device, the image output device producing a calibration image, as a function of an output medium, for a plurality of halftone screens capable of being produced by the image output device;

a processor communicating with the controller, the processor calculating a plurality of candidate tone reproduction curve sets for the specified output medium, each of the sets corresponding to one of the plurality of halftone screens; and means for accepting the candidate tone reproduction curve sets for compensating for a calibration drift in the image output device, wherein the accepted set of tone reproduction curves is used by the controller for converting original image data to final image data after an acceptance boundary is reached, the acceptance boundary being specified by a user.

10. A method for compensating for a calibration drift in an image output device, comprising:
   specifying a calibration boundary;
   rendering a target output image on the image output device after the calibration boundary is reached, a plurality of halftone screens capable of being produced by the image output device being represented on the target output image;
   measuring colors included on the target output image;
   calculating a set of candidate tone reproduction curves for each of the halftone screens;
   accepting one of the candidate tone reproduction curve sets; and
   processing future image data, which is used to produce images on the output device, with the accepted candidate set of tone reproduction curves.

11. The method for compensating for a calibration drift in an image output device as set forth in claim 10, wherein the accepting step includes:
   selecting the candidate tone reproduction curve set.

12. The method for compensating for a calibration drift in an image output device as set forth in claim 10, further including:
   specifying an acceptance boundary, the step of processing being performed after the acceptance boundary is reached.

13. The method for compensating for a calibration drift in an image output device as set forth in claim 10, further including:
   viewing existing sets of tone reproduction curves; and
   comparing an existing set of tone reproduction curves with a candidate set of tone reproduction curves.

14. The method for compensating for a calibration drift in an image output device as set forth in claim 13, further including:
   storing the candidate sets of tone reproduction curves for use in the future as the existing sets of tone reproduction curves.

15. The method for compensating for a calibration drift in an image output device as set forth in claim 10, further including:
   reverting to a previously stored set of tone reproduction curves.

16. The method according to claim 1, wherein the step of identifying the calibration boundary includes specifying a delay for calibration.

17. The method for calibrating a printer output device as set forth in claim 2, further comprising:
   identifying a calibration boundary; and
   suspending an output process of the image output terminal after the identified calibration boundary, wherein the step of identifying the calibration boundary includes specifying a delay for the calibration.

18. The method for calibrating a printer output device as set forth in claim 3, further comprising:
   identifying a calibration boundary; and
   suspending an output process of the image output terminal after the identified calibration boundary, wherein the step of identifying the calibration boundary includes specifying a delay for the calibration.

19. The method for calibrating a printer output device as set forth in claim 4, further comprising:
   identifying a calibration boundary; and
   suspending an output process of the image output terminal after the identified calibration boundary, wherein the step of identifying the calibration boundary includes specifying a delay for the calibration.

20. The method for calibrating a printer output device as set forth in claim 5, further comprising:
   identifying a calibration boundary; and
   suspending an output process of the image output terminal after the identified calibration boundary, wherein the step of identifying the calibration boundary includes specifying a delay for the calibration.

* * * * *